(12) United States Patent
Masaki et al.

(10) Patent No.: US 7,343,825 B2
(45) Date of Patent: Mar. 18, 2008

(54) TORQUE SENSOR

(75) Inventors: Ryoso Masaki, Tokyo (JP); Ryoichi Menju, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 88 days.

(21) Appl. No.: 11/041,219

(22) Filed: Jan. 25, 2005

(65) Prior Publication Data
US 2005/0160835 A1 Jul. 28, 2005

(30) Foreign Application Priority Data
Jan. 26, 2004 (JP) .............. 2004-017424

(51) Int. Cl.
*G01L 3/02* (2006.01)
(52) U.S. Cl. .............. 73/862.333; 73/862.331
(58) Field of Classification Search ........... 73/862.331, 73/862.333
See application file for complete search history.

(56) References Cited
U.S. PATENT DOCUMENTS
5,431,063 A * 7/1995 Yasui ................ 73/862.333
5,850,045 A * 12/1998 Harada et al. ......... 73/862.333
5,907,105 A * 5/1999 Pinkerton et al. ...... 73/862.336
2001/0045135 A1* 11/2001 Horiuchi et al. ....... 73/862.333

FOREIGN PATENT DOCUMENTS
JP 6-221940 A 8/1994
JP 6-273247 A 9/1994
JP 7-83769 A 3/1995

* cited by examiner

*Primary Examiner*—Edward Lefkowitz
*Assistant Examiner*—Freddie Kirkland, III
(74) *Attorney, Agent, or Firm*—Foley & Lardner LLP

(57) ABSTRACT

A magnetostriction-type torque sensor has a rotating shaft having magnetostrictive properties and first and second coils which each constitute three or more closed loops. For each coil, the closed loop is disposed in a concentric relationship (a concentric circle located on a plane perpendicular to the rotating shaft) with the rotating shaft. Further, the direction of magnetostrictive properties of the rotating shaft detected by the first coil is made different from the direction of magnetostrictive properties of the rotating shaft detected by the second coil.

26 Claims, 9 Drawing Sheets

FIG. 16
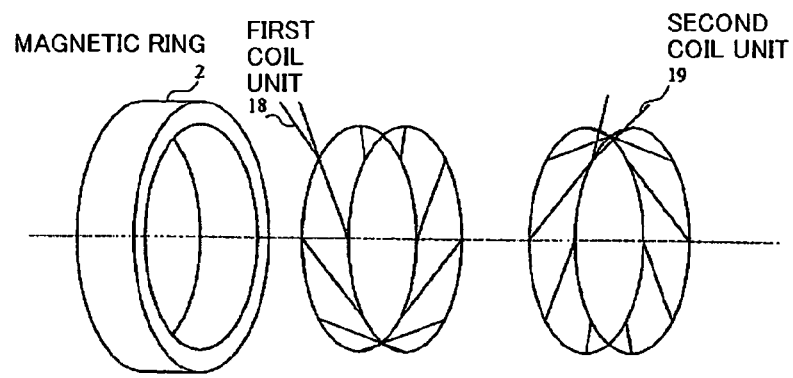
FIG. 17A    FIG. 17B
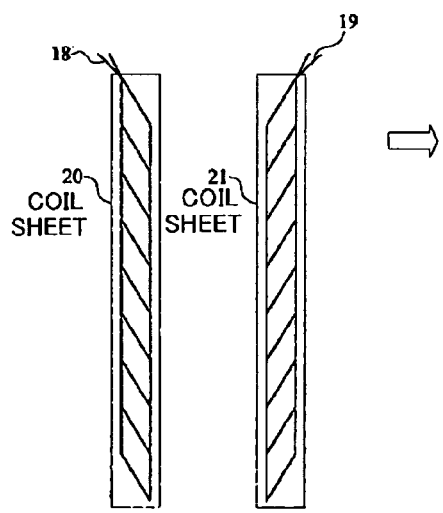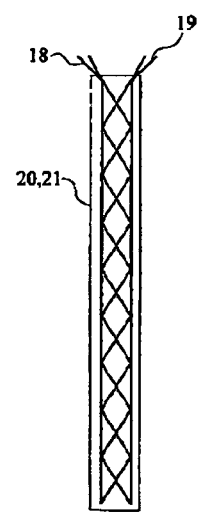
FIG. 18
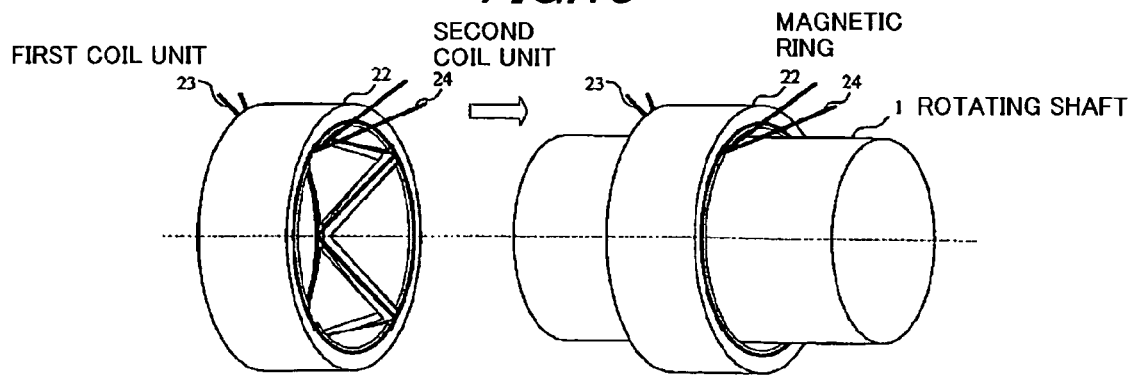

FIG.19A
FIG.19B
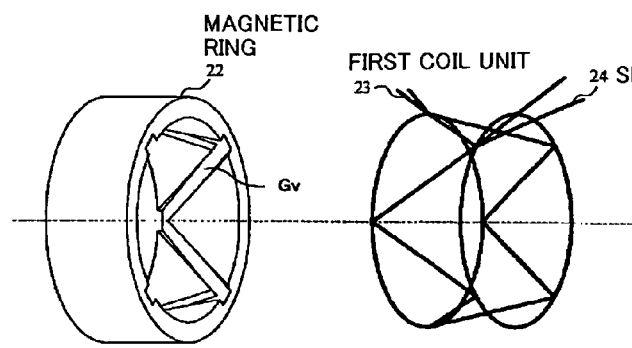
FIG.20
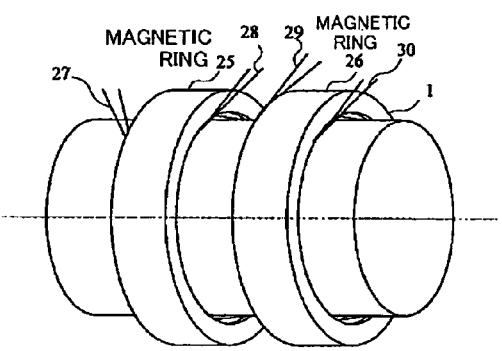
FIG.21A
FIG.21B
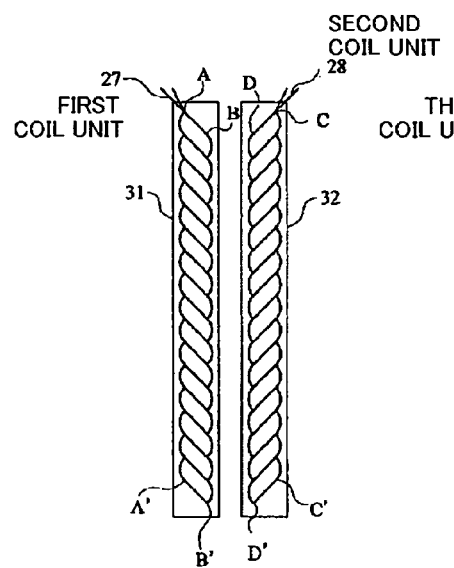
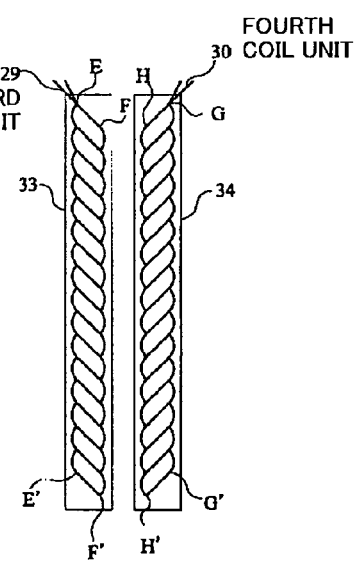

TORQUE SENSOR

The present application is based on Japanese patent application No. 2004-17424, the entire contents of which are incorporated herein by reference.

BACKGROUND OF THE INVENTION

1. Field of the Invention

The invention relates to a torque sensor for measuring a torque applied to a rotating shaft and particularly to a downsizing technique of a torque sensor used for various rotating shaft-equipped apparatuses, such as automobiles and industrial equipment, which can be improved in performance by feedback control of a torque.

2. Description of the Related Art

A system has been used in which the torque of a rotating shaft provided in automobiles and industrial equipment is measured and feedback control is carried out based on the measured value. In particular, engine control units and electromotive power steering devices are typical examples of applications of the system. Also in electric operation-assisted bicycles, a torque assist is carried out by a motor according to the force on the pedal of a person who rides on the bicycle, and, in this case, a sensor for measuring the torque is indispensable. Further, a device for measuring a cutting torque applied to a workpiece for control has been put to practical use for use in machine tools such as NCs. Thus, torque sensors for measuring the torque of the rotating shaft are of growing importance for high-performance control.

In general, the application of force in the direction of compression to a material having magnetostrictive properties causes a change in magnetization of the material having magnetostrictive properties, and the relative permeability is reduced. A magnetostrictive torque sensor using a rotating shaft having magnetostrictive properties has hitherto been well known as a technique for measuring the torque utilizing this principle.

Methods usable for this are described in Japanese Patent Laid-Open Nos. 83769/1995, 221940/1994, and 273247/1994. Among them, the first method is described in Japanese Patent Laid-Open No. 83769/1995. Specifically, the first method is a technique in which a slit, a groove or the like is provided in a direction at an angle of ±45 degrees to the rotating shaft to detect a magnetic variation attributable to magnetostrictive properties. Upon the application of a torque to the rotating shaft, force of compression occurs in one 45-degree direction of the rotating shaft, and tensile force occurs in the other 45-degree direction of the rotating shaft. Therefore, when a slit is provided in a direction to which compression force is applied, the compression force in this direction is concentrated, resulting in reduced relative permeability. The magnitude of the torque is detected by detecting this state of change as a change in inductance by utilizing an externally wound coil. This method is characterized in that the torque can be stably detected independently of the angle of rotation of the rotating shaft.

The second method is a technique disclosed in Japanese Patent Laid-Open No. 221940/1994 in which a change in the magnetized state in a direction at an angle of ±45 degrees to the rotating shaft having magnetostrictive properties is detected with an 8-shaped coil. The third method is a technique disclosed in Japanese Patent Laid-Open No. 273247/1994 in which two sets of coils prepared by folding back waved wiring into a ladder form are disposed respectively in ±45-degree directions relative to the rotating shaft to detect a change in the magnetized state in the direction depending upon the torque. The second and third methods are characterized in that there is no need to work the rotating shaft so far as the rotating shaft has magnetostrictive properties.

The above methods, however, suffer from the following problems.

The first method requires the provision of a groove in the rotating shaft or the application of a thin film having magnetostrictive properties, making it necessary to work the shaft per se. Therefore, when the rotating shaft cannot be worked without difficulties as in the case of engine torque or transmission torque, the application of the first method is disadvantageously difficult.

The second and third methods are characterized in that there is no need to work the shaft. In these methods, however, a change in the angle of the rotating shaft disadvantageously causes a change in the region of the rotating shaft to be measured, disadvantageously posing a problem that the magnetic properties vary depending upon the angle of rotation. Therefore, even when the torque applied is constant, the output of the torque sometimes varies depending upon the angle of rotation.

SUMMARY OF THE INVENTION

It is an object of the invention to provide a torque sensor that can provide an output proportional to the applied torque without the need to work the rotating shaft and without dependence upon the angle of the rotating shaft.

It is another object of the invention to provide a torque sensor that has excellent sensitivity and response while reducing the volume occupied by the sensor.

(1) According to one aspect of the invention, a torque sensor for detecting a torque of a rotating shaft having magnetostrictive properties comprises:

coil units which each comprise a plurality of coils and are disposed along a virtual concentric circle drawn on said rotating shaft, said coil units including lines extended in a direction which crosses a direction substantially parallel to the direction of rotation of said rotating shaft, said coil units constituting a folded structure comprising first wiring comprising a line, which constitutes a snaking first path and is extended in a direction which crosses a direction substantially parallel to the direction of rotation of the rotating shaft, and second wiring which constitutes a snaking second path, insulation being made at crossed parts where the first wiring crosses the second wiring, a closed coil is formed in a region surrounded by the first wiring and the second wiring; and a detection section to detect a change in properties of the coil units.

According to this torque sensor, since at least one of the first and second coil units is disposed in the shortest distance on the outer circumference of the rotating shaft, the size of the torque sensor can be reduced. In particular, when both the first and second coil units are disposed along the (virtual) concentric circle on the rotating shaft in such a state that the coil faces of the first and second coils are superimposed radially, the torque can be accurately measured without dependence upon the angle of the rotating shaft and, at the same time, the size of the torque sensor can be reduced.

(2) According to another aspect of the invention, a torque sensor for detecting a torque of a rotating shaft having magnetostrictive properties comprises:

first and second coil units which each comprise a plurality of coils and are disposed along a virtual concentric circle drawn on said rotating shaft, said first and second coil units including lines extended in a direction which crosses a direction substantially parallel to the direction of rotation of said rotating shaft, said coil units constituting a folded structure comprising first wiring constituting a snaking first path and second wiring constituting a snaking second path, insulation being made at crossed parts where the first wiring crosses the second wiring, a closed coil is formed in a region surrounded by the first wiring and the second wiring; and a detection section to detect a change in properties of the coil units.

Preferably, the first wiring and the second wiring each are formed by a first line extended in a direction substantially parallel to the direction of rotation of said rotating shaft, and a second line extended in a direction which crosses a perpendicular line to said first line, and said first line in the first coil unit and the first line in the second coil unit are arranged so that, at substantially the same position, the direction of flow of current, which flows in the first line in the first coil unit, is opposite to the direction of flow of current which flows in the first line in the second coil unit.

According to this torque sensor, since the position of the first lines disposed in a direction substantially parallel to the direction of rotation of the rotating shaft in the first coil unit is the same as that of the first lines disposed in a direction substantially parallel to the direction of rotation of the rotating shaft in the second coil unit, fine coil unit arrangement can be realized. Therefore, a reduction in size and an increase in efficiency are possible. Further, the first lines in first coil unit are disposed at substantially the same position as the first lines in the second coil unit so that current in the first lines in the first coil unit flows in a direction opposite to current in the first lines in the second coil unit. Therefore, the influence of noise is reduced, and, thus, increased performance can be realized.

(3) According to another aspect of the invention, a torque sensor for detecting a torque of a rotating shaft having magnetostrictive properties comprises:

first and second coil units that are disposed so as to surround the outer circumference of said rotating shaft, wherein said first and second coil units each are in a concentric relationship with said rotating shaft, and are provided with first wiring constituting a current path for allowing current to flow snake-wise in one direction of the directions of rotation of said rotating shaft and second wiring constituting a current path, folded from said first wiring, for allowing current to flow snake-wise in the other direction of the directions of rotation of said rotating shaft, wherein said first wiring and said second wiring in said first coil unit include a plurality of current paths that are extended substantially parallel to the direction of action of one of two forces acting on said rotating shaft, are close to each other, and allow current to flow therethrough in an identical direction, and wherein said first wiring and said second wiring in said-second coil unit include a plurality of current paths that are extended substantially parallel to the direction of action of the other force of two forces acting on said rotating shaft and allow current to flow therethrough in an identical direction.

According to this invention, a torque sensor, which can provide highly linear output properties based on the applied torque without dependence upon the angle of the rotating shaft, can advantageously be realized in a compact form.

BRIEF DESCRIPTION OF THE DRAWINGS

The preferred embodiments according to the invention will be explained below referring to the drawings, wherein:

FIG. 16 is an exploded perspective view illustrating the magnetic ring 2 and the first and second coil units shown in FIG. 15 which have been exploded;

FIG. 17A is a development diagram showing the first and second coil units shown in FIG. 16 which have been developed;

FIG. 17B is a diagram showing the first and second coil units shown in FIG. 16 which have been superimposed on each other;

FIG. 18 is a perspective view showing an example of the construction of a torque sensor in a sixth preferred embodiment of the invention in which a groove for inserting a coil unit has been provided in a magnetic ring;

FIG. 19A is an exploded perspective view illustrating a magnetic ring dismantled from the assembly shown in FIG. 18;

FIG. 19B is an exploded perspective view illustrating first and second coil units dismantled from the assembly shown in FIG. 18;

FIG. 20 is a perspective view of a torque sensor in a seventh preferred embodiment of the invention;

FIGS. 21A and 21B are development diagrams showing the four coils used in FIG. 20 which have been developed;

DESCRIPTION OF THE PREFERRED EMBODIMENTS

Torque sensors in the preferred embodiments of the invention will be explained below.

Figure 1:
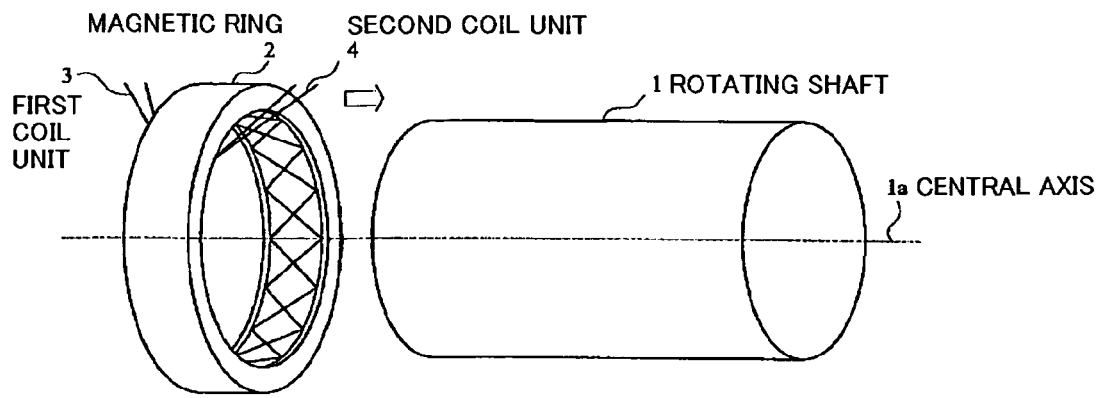
FIG. 1 is an exploded perspective view of an example of the construction of a torque sensor in a first preferred embodiment of the invention, in which a rotating shaft having magnetostrictive properties, a magnetic ring, and a coil unit are shown.

FIG. 1 is an exploded perspective view of an example of the construction of the torque sensor in the first preferred embodiment. As shown in FIG. 1, the torque sensor in the first embodiment can detect a torque in a rotating shaft 1 having magnetostrictive properties and not having any groove or the like on its surface.

The torque sensor in the first embodiment shown in FIG. 1 has a structure including a magnetic ring 2 which can be disposed on the outer circumference of the rotating shaft 1. A first coil unit 3 and a second coil unit 4 which are provided on an inscribed face of the magnetic ring 2. In order to measure the torque of the rotating shaft 1, the magnetic ring 2 on which the first coil unit 3 and the second coil unit 4 have been disposed should be disposed on the outer circumference of the rotating shaft 1.

Figure 2:
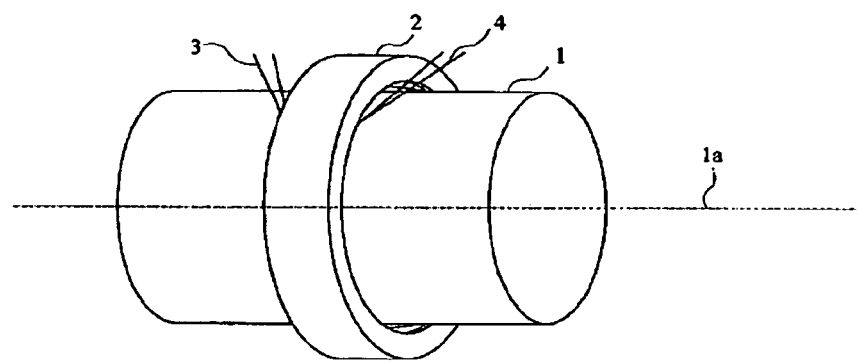
FIG. 2 is a diagram showing an example of the construction of a torque sensor constructed by combining the parts shown in FIG. 1.

FIG. 2 is a diagram showing such a state that the magnetic ring 2 is disposed on the outer circumference of the rotating shaft. As shown in FIG. 2, the magnetic ring 2 is disposed so that the magnetic ring is coaxial with the central axis 1a of the cylindrical rotating shaft 1 and a virtual line radially extended in the rotating shaft 1 is substantially parallel to a normal of the inner face of the magnetic ring 2.

Figure 3:
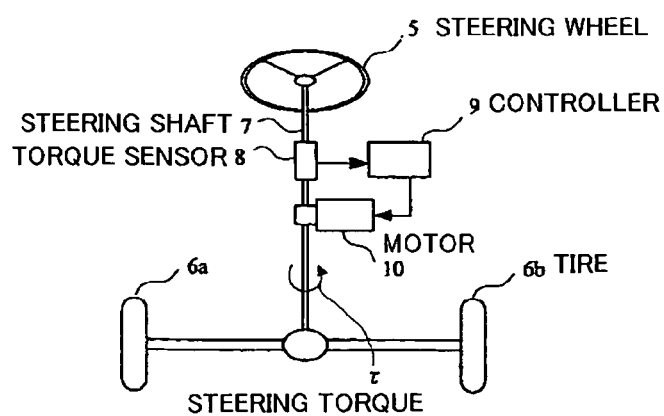
FIG. 3 is a diagram showing an example of the construction of an electric power steering device utilizing the torque sensor of FIG. 1.

Before the explanation of the principle, construction, etc. of the torque sensor, an example of the construction of an electric power steering device utilizing the torque sensor in this embodiment will be explained in conjunction with FIG. 3. Specifically, the principle of operation of the torque sensor shown in FIG. 3 will be explained. As shown in FIG. 3, in the electric power steering device utilizing the torque sensor in this embodiment, when a driver rotates a steering wheel 5, a steering torque τ can be measured with a torque sensor 8 (corresponding to the first coil unit 3 and the second coil unit 4) mounted on a steering shaft (corresponding to the rotating shaft 1). The detected steering torque τ is input into a controller 9, an optimal assist torque which should assist a motor 10 is calculated, and the motor 10 is controlled based on the assist torque.

The motor 10 is constructed so as to drive the steering shaft 7 and adds an assist torque to the steering shaft 7 so that the steering operation of the driver can be lightened to an appropriate level. This enables the steering angle of the tires 6a, 6b to be easily varied by a small steering torque τ. In the electric power steering device, the torque sensor shown in FIGS. 1 and 2 is preferred as the torque sensor 8 which can be provided on the steering shaft in a compact and cost-effective manner.

Figure 4:
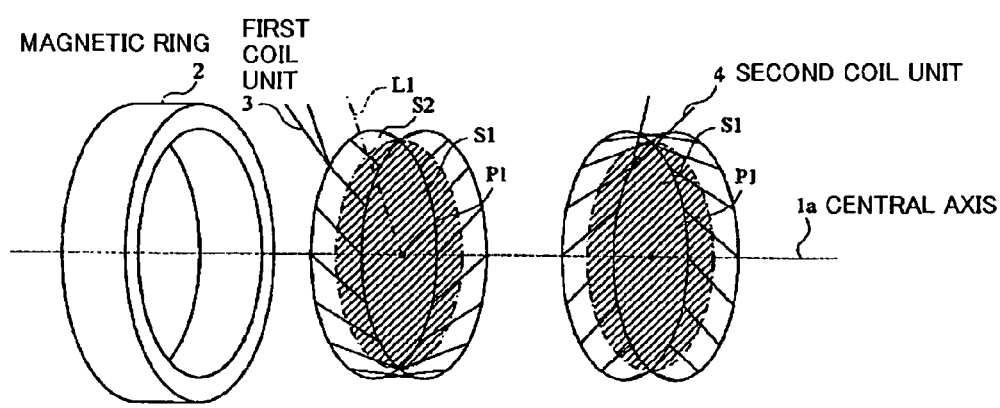
FIG. 4 is an exploded perspective view showing the magnetic ring and the first and second coil units shown in FIG. 1.

FIG. 4 and FIGS. 5A, 5B and 5C are detailed exploded views showing the construction of the magnetic ring 2, the first coil unit 3, and the second coil unit 4 shown in FIG. 1. The first and second coil units 3, 4 are constructed as shown in FIG. 5. In FIG. 4, a center point P1 of a circular plane surface S1 (a hatched part) surrounded by a curved surface S2 formed by the first coil unit 3 and, likewise, a center point P1 of a circular plane surface S1 surrounded by a curved surface formed by the second coil unit 4 pass through a central axis 1a. L1 passes through the center point P1 and constitutes a normal to the curved surface S2.

Figures 5A, 5B, 5C:
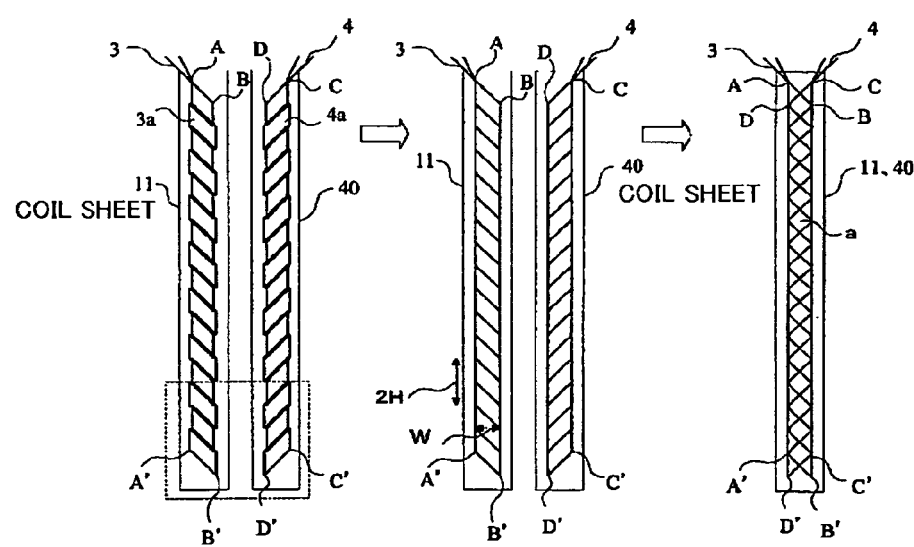
FIG. 5A is a development view illustrating developed first and second coil units.
FIG. 5B is a development view illustrating developed first and second coil units.
FIG. 5C is a development view showing an example of the construction in which first and second coil units have been superimposed on each other.

As shown in FIG. 5A, in the first coil unit 3, for example, one wiring is snaked in a wavy form (zigzag form) from an apex A and is formed from the top downward to an apex A' on the drawing. Next, conducted is a wiring in an oblique downward direction from the apex A' to the apex B'. Here from the apex B' to the apex A, wiring is formed in a folded wavy (zigzag) form from the bottom to the top on the drawing. In this case, the wiring in one direction and the wiring in the other direction, which cross each other, are spaced vertically and are insulated from each other.

Thus, from the top, a plurality of rightward lowered substantially parallelogramatical coils 3a (even number; 16 in the drawing) are formed. The method for disposing the coil unit 3 (winding method) is characterized in that, when current is allowed to flow across the coil unit 3, magnetic flux is produced within the parallelogramatical coils 3a by the current of the wiring constituting the parallelogramatical coils 3a in an identical direction. In this case, the directions of magnetic fluxes in adjacent parallelogramatical coils 3a are opposite to each other. In addition, among the inner angles of the parallelogram, the two narrow angles are preferably 45 degrees. The reason for this will also be explained later. The first coil unit 3 is wired in a coil sheet 11 formed of, for example, a nonmagnetic material. As shown in FIG. 4, one wiring constituting the first coil unit and one wiring constituting the second coil unit are constructed so that current can be allowed to flow by applying, for example, voltage from both ends thereof, whereby magnetic flux can be produced in the coil in the coil unit 3 and the coil in the coil unit 4.

Regarding the second coil unit 4, as with the case of the third coil unit 3, wiring is provided in a wavy form from apexes C, D to apexes C', D' and, in addition, wiring is then provided in a wavy form to the apex C. Thus, 16 in total of parallelogramatical coils 4a are formed. This second coil unit 4 is also preferably wired, for example, on a coil sheet 40 formed of a nonmagnetic material.

In FIG. 5A, in order to clearly illustrate the wire connection state of the first and second coil units 3, 4, the parallelograms are shown in a lightly shifted state. In fact, however, as shown in FIG. 5B, the first and second coil units 3, 4 are applied to the coil sheets 11, 40 formed of a nonmagnetic material so that the first and second coil units 3, 4 form parallelograms having rightward lowered (45 degrees) two long sides (or two short sides) and parallelograms having rightward lifted (45 degrees) two long sides (or two short sides) by superimposing the wirings on top of one another.

The first coil unit 3 shown in FIG. 4 is prepared by bringing the coil sheet 11 formed of a nonmagnetic material shown in FIG. 5B to a cylindrical form and allowing the apex A to conform to the apex A' and allowing the apex B to conform to the apex B'. Likewise, the second coil unit 4 shown in FIG. 4 may be formed by allowing the apex C to conform to the apex C' and allowing the apex D to conform to the apex D'. In fact, the first and second coil units 3, 4 can be disposed on the inscribed face of the magnetic ring 2 shown in FIG. 1 by putting the two coil units 3, 4 shown in FIG. 5B on top of each other so that, as shown in FIG. 5C, the coil 3a forming surface faces the coil 4a forming surface, and then rolling the assembly into a cylinder form.

The shape of the wiring shown in FIG. 5 is specified by the following equation. The length H in the circumferential direction of the parallelogram and the width W of the coil are given by the following equation.

$$H = W = \pi(D+2g)/N \approx \pi D/N \text{ (where } g \ll D\text{)}$$

Here D represents the diameter of the rotating shaft (FIG. 1); g represents the void length between the rotating shaft and the magnetic ring (FIG. 2); and N represents the total number of coils (for FIG. 5, N=16) provided in the first and second coil units 3, 4.

When the coil unit is designed based on the above equation, as shown in FIG. 5C, when the first and second coil units 3, 4 are put on top of each other, square shapes a are regularly defined by the wirings in the center part and are arranged in an extended direction of the coil units. Therefore, the influence between the two coils can advantageously be reduced.

Figure 6A:
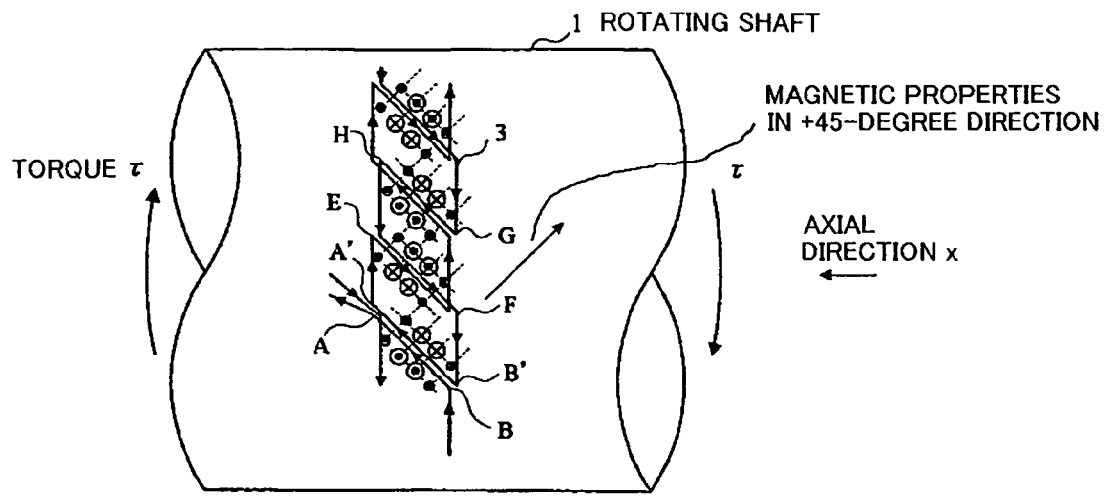
FIG. 6A is a distribution map of current and magnetic flux showing the relationship between the direction of current and the direction of magnetic flux provided by the current in the case where current is allowed to flow across a first coil.

Next, the principle of operation of the above coil units will be explained in conjunction with FIGS. 6A and 6B. FIG. 6A is a diagram showing the relationship between coil current and magnetic flux in the case where the first coil unit 3 shown in FIG. 5A is enlarged and is mounted around the rotating shaft 1. As shown in FIG. 6A, in the same manner as described above, the first coil unit 3 is disposed on the circumference of the rotating shaft 1 so that the apex A substantially conforms to the apex A' and the apex B substantially conforms to the apex B'.

In the first coil unit 3, when current is allowed to flow from the apex B toward the apex A, also for the apexes B' and A', first current is allowed to flow from the apex B' toward the apex A'. Therefore, as shown in FIG. 6A, regarding the parallelogram EFB'A' defined by the apexes E, F, B', and A', current is allowed to flow clockwise as viewed from the center of the parallelogram EFB'A'. The magnetic flux caused by the first current occurs from the front side toward the back side of the paper surface according to the right-handed screw rule. In the parallelogram EFGH defined by the apexes E, F, G, and H adjacent to the parallelogram EFB'A', the second current is allowed to flow anticlockwise. Therefore, the magnetic flux based on this occurs from the back side toward the front side of the paper surface. Specifically, when the second current is allowed to flow across the coil unit 4, in the parallelogramatical coils adjacent to each other, magnetic fluxes opposite to each other in direction occur.

Figure 7:
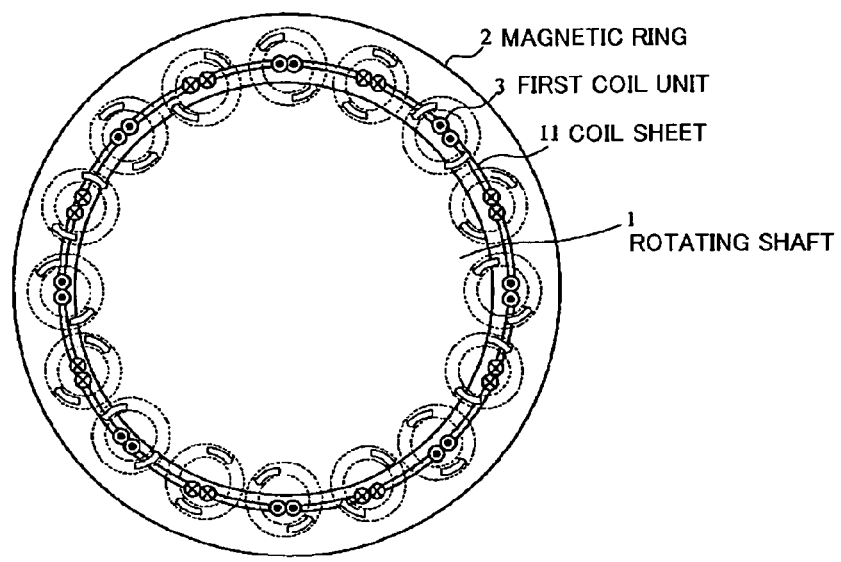
FIG. 7 is a distribution map of current and magnetic flux in the case where the relationship between the current and the magnetic flux shown in FIG. 6 has been viewed from the axial direction.

At that time, when the state of the magnetic flux is viewed from the axial direction x, as shown in FIG. 7, a magnetic path occurs about the wiring of the first coil unit 3 and the magnetic path is passed through a portion between the rotating shaft 1 and the magnetic ring 2. The magnetic flux is generally passed through such a passage that the magnetic resistance is minimal and the magnetic path is short. Therefore, as shown in FIG. 6A, for the rightward lowered (45 degrees) wiring, as indicated by an arrow, a magnetic path is formed in a +45-degree (rightward lifted) direction. Therefore, when parallelogramatical wiring having two rightward lowered sides is formed as in the first coil unit 3, electrical characteristics are determined by the influence of magnetic properties in a +45-degree direction which is a direction orthogonal to the direction of the two sides.

Here, as shown in FIG. 6A, it is assumed that a torque, which rotates the rotating shaft 1 anticlockwise on the front side (right side in the drawing) as viewed from the axial direction x and clockwise on the rear side (left side in the drawing), has occurred (the torque in this direction will be hereinafter referred to as "forward torque").

In this case, compressive force is applied in a +45-degree direction of the rotating shaft, and tensile force is applied in a −45-degree (rightward lowered) direction. Therefore, in the rotating shaft 1 having magnetostrictive properties, the relative permeability in the +45-degree direction is reduced, and the relative permeability in the −45-degree direction is increased. Regarding the magnetic path formed in the first coil unit 3, as described above, the electrical characteristics are determined by the influence of the magnetic properties in the +45-degree direction. Therefore, the relative permeability is reduced, and the inductance of the first coil unit 3 is reduced. On the other hand, when a torque has occurred in a negative direction, the relative permeability is not reduced and the inductance is increased.

Figure 6B:
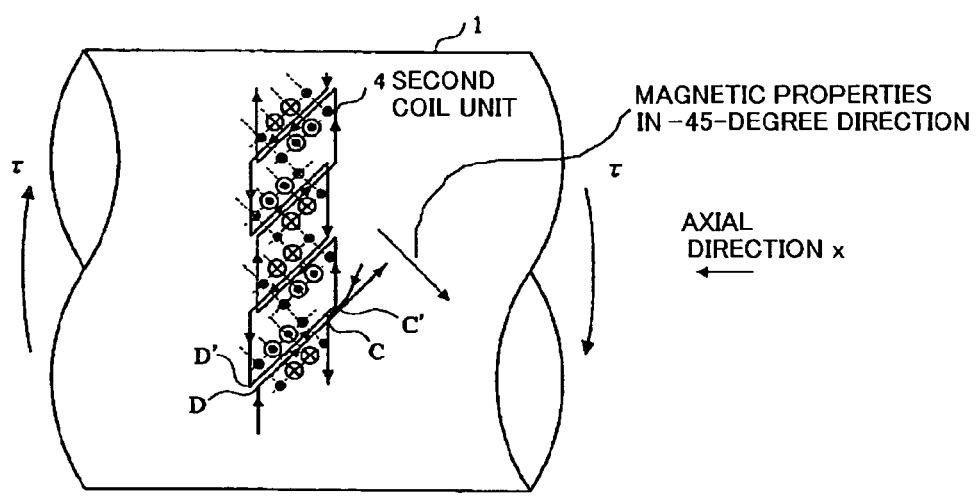
FIG. 6B is a distribution map of current and magnetic flux showing the relationship between the direction of current and the direction of magnetic flux provided by the current in the case where current is allowed to flow across a second coil.

On the other hand, in the second coil unit 4 shown in FIG. 6B, parallelogramatical coils having two rightward lifted (45 degrees) sides are formed. Upon the flow of current as shown in the drawing across this coil, a magnetic path occurs in a −45-degree direction. Therefore, in the second coil unit 4, contrary to the first coil unit 3, upon the action of the torque in a negative direction, the relative permeability is reduced and the inductance is lowered.

Accordingly, a change in magnetism caused by the magnetostrictive properties can be detected with the first and second coil units 3, 4. The wiring in the first coil unit 3 and the wiring in the second coil unit 4 are orthogonal to each other. Therefore, the influence of the magnetic flux produced by the flow of current across the first coil unit 3 on one parallelogramatical coil 4a in the second coil unit is cancelled and becomes zero in total. Likewise, the magnetic flux produced by the flow of current across the second coil unit 4 also does not influence one parallelogramatical coil in the first coil unit. Thus, one feature of the torque sensor in this embodiment is that two coil units are disposed so that they are not influenced by each other.

Figure 8:
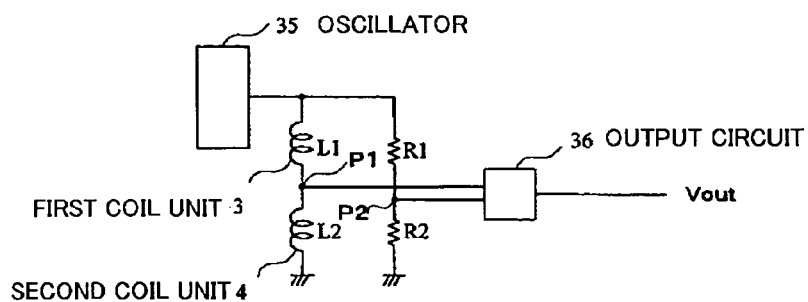
FIG. 8 is a diagram showing an example of the construction of a torque detection circuit for detecting a torque based on a change in inductance of first and second coil units in the embodiment of the invention.

FIG. 8 is a diagram showing an example of the construction of a torque detection circuit for detecting a torque from electrical characteristics of the first coil unit 3 and the second coil unit 4. As shown in FIG. 8, in the torque detection circuit in this embodiment, high-frequency voltage produced from an oscillator 35 is applied to a circuit in which the first coil unit 3 and the second coil unit 4 are connected in series. L1 designates the inductance of the first coil unit 3, and L2 the inductance of the second coil unit 4. Further, high-frequency voltage is also applied to a circuit in which the resistor R1 and the resistor R2 are connected in series. Voltage at a junction point P1 between the first coil unit 3 and the second coil unit 4 and voltage at a junction point P2 between the resistor R1 and the resistor R2 are input into an output circuit 36, and the voltage difference is amplified and output (Vout).

As shown in FIG. 6A, when a torque occurs in a forward direction, the inductance L1 in FIG. 8 reduces while the inductance L2 increases. Therefore, the output Vout in the output circuit 36 is increased in a positive value. On the other hand, when a torque occurs in a negative direction, the inductance L1 increases while the inductance L2 reduces. Therefore, in this case, the output Vout in the output circuit 36 is reduced. Under this principle, the output Vout of the torque detection circuit varies depending upon a torque τ applied to the rotating shaft 1, and the torque can be detected based on Vout. In the torque sensor in this embodiment, when a coil unit 3 or 4 with an even number of coils (3a or 4a), for example, four or more coils, is used, the coil unit 3 or 4 can be disposed on the entire circumference of the rotating shaft 1, and, thus, the torque sensor is less likely to be influenced by magnetic termination.

When the coil units 3, 4 are disposed on the entire circumference of the rotating shaft 1, even in the case where a local change in magnetic properties in the rotating shaft 1 has occurred, the objective face for detection can be made identical without dependence upon the angle of rotation of the rotating shaft 1. Therefore, the influence of the torque sensor on the output properties Vout is reduced, and, thus, advantageously, the torque in the rotating shaft 1 can be stably detected.

Further, since the coil units 3, 4 can be disposed concentrically on the outer circumference of a vertical section in the rotating shaft 1, the width of the torque sensor can advantageously be shortened. When two coil units 3, 4 are disposed so as to be superimposed on top of each other so that two sides of parallelogramatical coils are orthogonal to each other for the purpose of detecting inductance in ±45-degree direction, mutual influence of the coil units 3, 4 on electrical characteristics can be avoided. Therefore, in this case, advantageously, the width of the sensor can be further reduced. When a construction in which the coil units are applied to a coil sheet formed of a nonmagnetic material is adopted, handleability can be significantly improved.

Next, the torque sensor in the second preferred embodiment of the invention will be explained.

Figure 9:
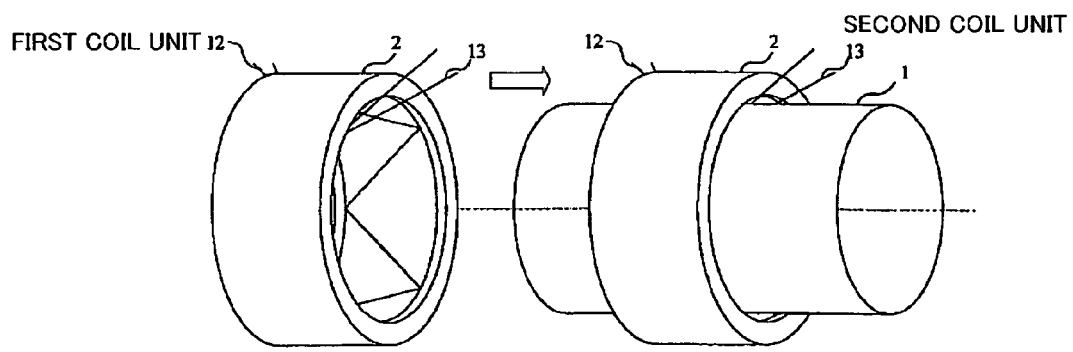
FIG. 9 is an assembly diagram of a torque sensor in a second preferred embodiment of the invention in which first and second coil units are used.
Figure 10A:
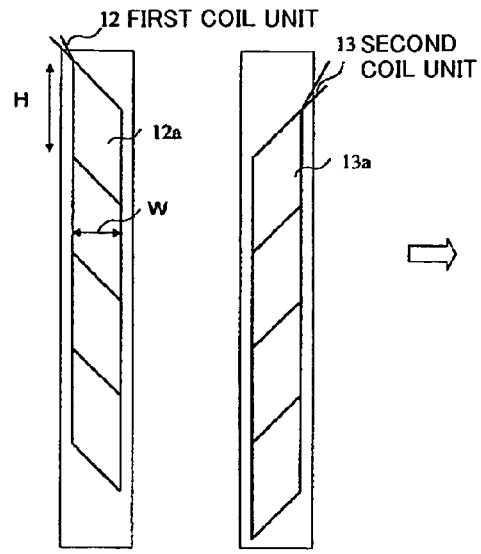
FIG. 10A is a development diagram of first and second coil units showing a winding method applied in FIG. 9.
Figure 10B:
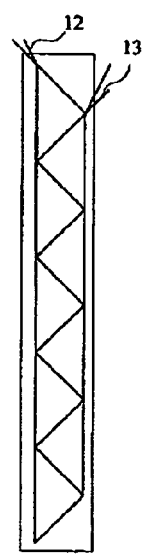
FIG. 10B is a diagram showing a construction comprising first and second coil units superimposed on each other.

FIG. 9 is a diagram showing an example of the construction of a coil unit which is different in shape of the coil unit from the coil unit in the torque sensor in the first embodiment. As shown in FIG. 9, in the torque sensor in the second embodiment, the first and second coil units 12, 13 are disposed on the inner face of the magnetic ring 2. Further, the magnetic ring 2 provided with the coil units 12, 13 are provided on the outer circumferential face of the rotating shaft 1. FIG. 10A is a development diagram of the coil units 12, 13 in the torque sensor in this embodiment. As with the coil unit in FIG. 5, the coil unit is wound in a wavy form. In the case of the torque sensor in this embodiment, four coils 12a are included in the first coil unit 12, and four coils 13a are included in the second coil unit 13. When the first and second coil units 12, 13 are disposed so as to be superimposed on top of each other in a cylindrical form as shown in FIG. 10B, the assembly can be brought to such a form that comes into contact with the inner face of the magnetic ring 2 as shown in FIG. 9. The form of the wiring shown in FIGS. 10A and 10B can be Here D represents the diameter of the rotating shaft (FIG. 1); g represents the void length between the rotating shaft and the magnetic ring (FIG. 2); and N represents the total number of coils (for FIG. 5, N16) provided in the first and second coil units 3, 4. specified by the following equations.

$$H=\pi(D+2g)/N \approx \pi D/N \text{ (when } g<<D)$$

$$W=H/2 \approx \pi D/2N \text{ (when } g<<D)$$

wherein H represents the length of the parallelogram in the circumferential direction; and W represents the width of the coil.

In the construction shown in FIGS. 10A and 10B, N is 4. Specifically, two sides in a substantially parallelogramatical form constituting each coil of the first coil unit 12 are disposed on a diagonal line in a substantially parallelogramatical form constituting each coil of the second coil unit 13, and the two sides in the substantially parallelogramatical form constituting each coil of the second coil unit 13 are disposed on a diagonal line in the substantially parallelogramatical form constituting each coil of the first coil unit 12.

In the case of the torque sensor in this embodiment, the form of winding in the coil is simpler than the form of winding in FIG. 5. Therefore, the torque sensor can advantageously be constructed in a simpler and cost-effective manner. Further, as shown in FIG. 10A, the magnetic flux in one closed loop produced by current in the second coil unit 13 is substantially closed within only one parallelogram in the first coil unit 12 by shifting the second coil unit 13 downward by H/2 relative to the first coil unit 12. Therefore, as compared with the torque sensor shown in FIG. 1, mutual interference between the two coils can be further reduced. For this reason, even when a change in form of the coil has occurred, influence on characteristics is small and stability on torque output properties can be improved. Further, advantageously, the coil width W can be reduced to the half of the length H in the circumferential direction of the parallelogram.

Next, the torque sensor in the third preferred embodiment of the invention will be explained.

Figure 11:
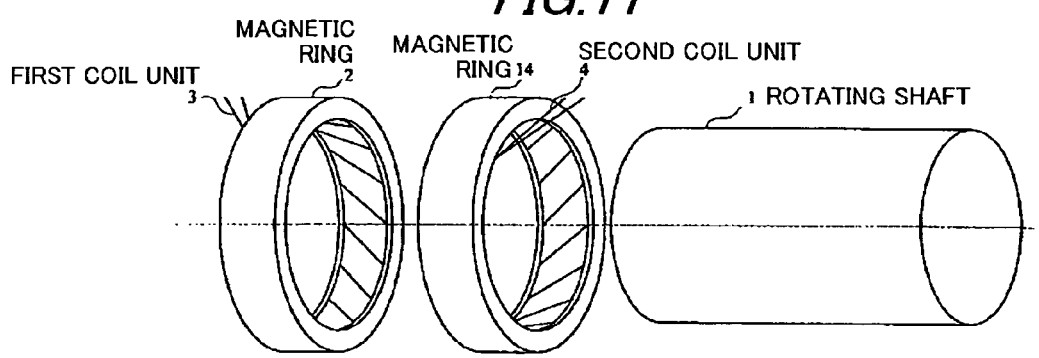
FIG. 11 is an exploded perspective view of a torque sensor in a third preferred embodiment of the invention in which two magnetic rings are used.
Figure 12:
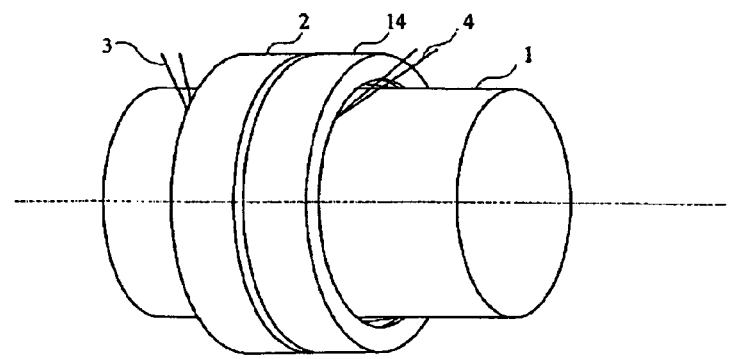
FIG. 12 is a perspective view of a torque sensor prepared by assembling parts shown in FIG. 11.

FIG. 11 is a perspective view showing the construction of the torque sensor in the third embodiment. The torque sensor in this embodiment has a construction which can shorten the length of a gap between the rotating shaft 1 and the magnetic ring 2. In this embodiment, two magnetic rings 2 and 14 are disposed. For each of the two magnetic rings 2, 14, a first coil unit 3 and a second coil unit 4 are disposed on the inscribed face of the magnetic ring, and a rotating shaft 1 having magnetostrictive properties is inserted into the magnetic rings 2, 14. This state is shown in FIG. 12. As shown in FIG. 12, the first coil unit 3 and the second coil unit 4 are not superimposed in a radial direction of the rotating shaft 1 and are independently disposed in such a direction that the rotating shaft 1 is extended. According to this arrangement, as compared with the torque sensors in the first and second embodiments, the gap between the rotating shaft 1 and the magnetic rings 2, 14 can be reduced.

In this case, since the magnetic resistance of the gap can be reduced, a change in magnetic resistance attributable to magnetostriction is relatively large as compared with the inductance of the whole coil. Therefore, advantageously, the sensitivity of the torque sensor is improved, and a high-sensitivity torque sensor can be realized.

Next, the torque sensor in the fourth preferred embodiment of the invention will be explained.

Figure 13:
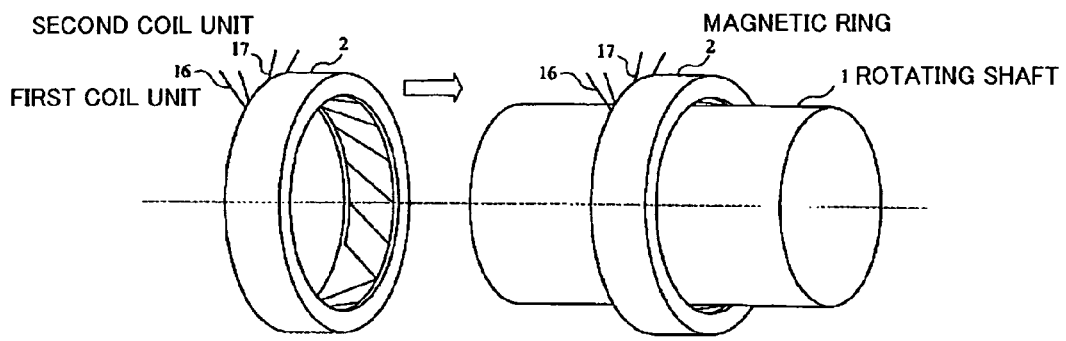
FIG. 13 is an assembly diagram of a torque sensor comprising first and second coil units arranged on the circumference in a fourth preferred embodiment of the invention.

FIG. 13 is a diagram showing an example of the construction of the torque sensor in the fourth embodiment. As with the torque sensor shown in FIG. 11, the torque sensor in this embodiment can shorten the gap. The torque sensor in this embodiment is different from the torque sensor in the embodiment shown in FIG. 11 in that only one magnetic ring 2 is used and the first coil unit 16 and the second coil unit 17 are disposed on the inscribed face of the magnetic ring 2.

Figures 14A, 14B:
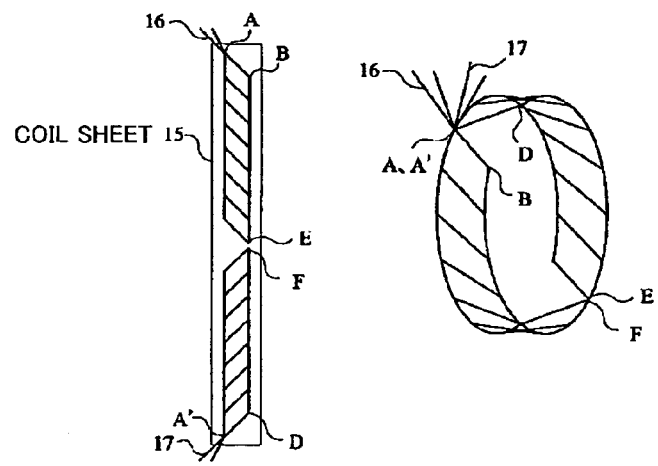
FIG. 14A is a development diagram illustrating the first and second coil units shown in FIG. 13 which have been developed.
FIG. 14B is a development diagram illustrating the first and second coil units shown in FIG. 13 which have been developed.

FIG. 14A is a diagram showing an example of the construction of a coil sheet 15 in which the first and second coil units 16, 17 have been developed. The first coil unit 16 and the second coil unit 17, in which the direction of two sides in the first coil unit 16 and the direction of two sides in the second coil unit 17 are +45 degrees and −45 degrees, respectively, are applied in series onto the coil sheet 15 in its longitudinal direction (vertical).

Winding of these coils shown in the drawing is the same as that in other embodiments and is wavy. However, it should be noted that there is no need to limit the number of parallelograms to an even number. In this embodiment, each coil unit has seven parallelograms. A ring form as shown in FIG. 14B can be formed by winding this coil sheet 15 in a cylindrical form and allowing an apex A to coincide with an apex A'. This ring is disposed on the inscribed face of the magnetic ring 2 shown in FIG. 13, and a change in inductance caused by magnetostrictive properties is detected. The use of the torque sensor in this embodiment can advantageously shorten the length of the gap and can also shorten the shaft length necessary for the torque sensor. Therefore, this method can realize a high-sensitivity and small-size torque sensor.

Next, the torque sensor in the fifth preferred embodiment of the invention will be explained.

Figure 15:
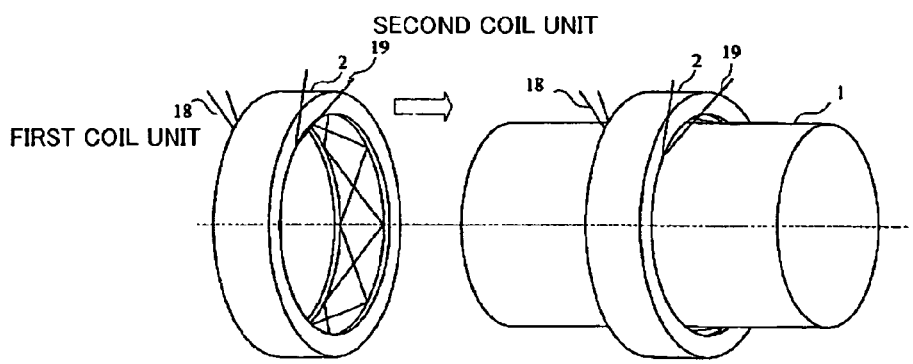
FIG. 15 is a perspective view of a torque sensor in a fifth preferred embodiment of the invention in which the width of a magnetic ring has been reduced.

FIG. 15 is a diagram showing an example of the construction of a torque sensor in the fifth embodiment which can shorten the width of the torque sensor. As shown in FIG. 16, a magnetic ring 2, a first coil unit 18, and a second coil unit 19 constituting a detection part in FIG. 15 can be dismantled. FIG. 17A is a development diagram showing the first and second coil units 18, 19 shown in FIG. 16 which have been developed. The first coil unit 18 and the second coil unit 19 are applied to a coil sheet 20 and a coil sheet 21, respectively. As shown in FIG. 17B, these coil sheets 20, 21 are superimposed on top of each other, and the assembly is disposed on the inner face of the magnetic ring 2 shown in FIG. 15. The torque sensor in this embodiment is characterized in that, regarding substantially parallelogramatical coils constituted by the coil units 20, 21, the narrow angle of the parallelogram is 30 degrees rather than 45 degrees. According to this construction, regarding the first and second coil units 18, 19 in FIG. 15, the length H in the circumferential direction of the parallelogram and the width W of the coil are given by the following equations.

$$H=\pi(D+2g)/N \approx \pi D/N \text{ (when } g \ll D)$$

$$W=H \cdot \tan(30 \text{ degrees}) \approx 0.5777 \pi D/N \text{ (when } g \ll D)$$

The first coil unit 18 is primarily provided for detecting a change in magnetic properties in a +45-degree direction of the rotating shaft 1, and the narrow angle of the parallelogram is ideally 45 degrees. As in the torque sensor in this embodiment, when the angle of the apex is reduced to 30 degrees, regarding the magnetic properties, the sensor undergoes influence in a +45-degree direction and influence in a −45-degree direction. In this case, the influence in a +45-degree direction is larger than the influence in a −45-degree direction.

This ratio is theoretically cos 15 degrees:sin 15 degrees=1.0:0.268. Likewise, regarding the magnetic properties of the second coil unit 19, influence in a +45-degree direction is smaller than influence in a +45-degree direction, and the ratio is 0.268:1.0. Therefore, when the first and second coil units 18, 19 are connected in series to detect a difference in inductance caused by magnetostrictive properties by the circuit shown in FIG. 8, output depending upon the direction and magnitude of the torque can be provided. When the torque sensor in this embodiment is used, the detection sensitivity is lowered. However, the width in the axial direction can advantageously be reduced. Regarding the form of the coil, when the angle of the narrow apex in the parallelogram of the coil is in the range of 15 degrees to 75 degrees, the torque can be detected. In fact, an angle range suitable for ensuring the detection accuracy from the results of the above calculation is 30 degrees to 60 degrees.

Next, the torque sensor in the sixth preferred embodiment of the invention will be explained.

FIG. 18 is a diagram showing an example of the construction of the torque sensor in the sixth embodiment. As shown in FIG. 18, in the torque sensor in this embodiment, a groove Gv for receiving wirings of first and second coil units 23, 24 is provided in the inscribed face of the magnetic ring 22. FIG. 19A is an exploded perspective view illustrating a magnetic ring 22 dismantled from the assembly shown in FIG. 18, and FIG. 19B is an exploded perspective view illustrating first and second coil units 23, 24 dismantled from the assembly shown in FIG. 18.

The provision of a groove Gv on the inner face of the magnetic ring 22 as shown in FIG. 18 and FIGS. 19A and 19B can significantly reduce the gap between the external face of the rotating shaft 1 and the inner face of the magnetic ring 22. Therefore, the sensitivity of output to torque can be further improved. In the torque sensor in this embodiment, in order to reduce the number of fabrications of the groove Gv, regarding wiring in the first coil unit 23 and wiring in the second coil unit 24, winding is preferably carried out in the same manner as that shown in FIGS. 10A and 10B. The coil units 23, 24 have four parallelograms. The torque sensor in this embodiment can advantageously further improve the torque detection sensitivity.

Next, the torque sensor in the seventh preferred embodiment of the invention will be explained.

FIG. 20 is a diagram showing an example of the construction of the torque sensor in the seventh embodiment. As shown in FIG. 20, the torque sensor in this embodiment comprises two magnetic rings 25, 26 and four coil units 27, 28, 29, 30. The first coil unit 26 and the second coil unit 27 are disposed on the inscribed face of the magnetic ring 25. Likewise, the magnetic ring 26 provided with the third coil unit 29 and the fourth coil unit 30 and the magnetic ring 25 are disposed in side-by-side relationship on the rotating shaft 1.

FIGS. 21A and 21B are diagrams showing the form of the coil units provided on two respective magnetic rings 25, 26 shown in FIG. 20. As shown in FIGS. 21A and 21B, for all the first to fourth coil units 26 to 29, the form of the closed loop is not in a substantially parallelogramatical form but a rounded form obtained by deforming the parallelogram. More specifically, the straight line of the two sides in the axial direction is changed to a quarter arcuate curved line. When the form of the coil is parallelogramatical, regarding a portion near the apex of the narrow angle, the area through which the magnetic flux is passed is small, making it difficult for the magnetic flux to pass. Accordingly, in order to increase the area of the region near the apex, an outward bulged arcuate coil form was adopted. According to this construction, the magnetic flux for detecting the magnetostrictive properties can be effectively utilized and, thus, sensitivity in detection of a torque can be further improved.

Figure 22:
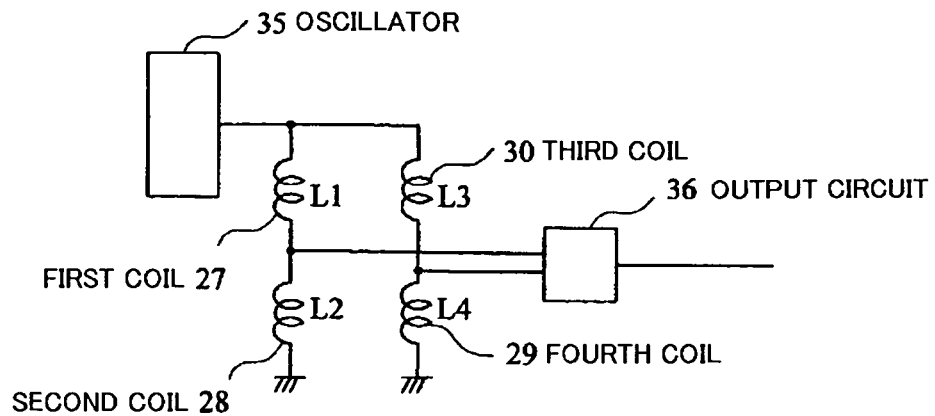
FIG. 22 is a diagram showing an example of the construction of an output circuit used in the torque sensor shown in FIG. 20.

As shown in FIG. 22, these four coils L1 to L4 are in an H bridge circuit form. For the first coil (L1) 27 and the third coil (L3) 30, when a torque has occurred in a forward direction, the relative permeability is lowered by the magnetostrictive effect. This lowers inductances L1, L4 thereof. Therefore, the output from the output circuit 36, that is, the detected value of the torque, is a positive value. On the other hand, when a torque in a negative direction has occurred, the relative permeability in the second coil 27 and the fourth coil 30 is reduced, resulting in lowered inductances L2 and L3. In this case, the output from the output circuit 36 is a negative value. The use of the H bridge circuit can reduce influence on output characteristics of the torque even when a temperature change has occurred or when power supply voltage has fluctuated. Therefore, a torque sensor having good stability against a change with the elapse of time and environmental conditions can be advantageously provided.

Figure 23:
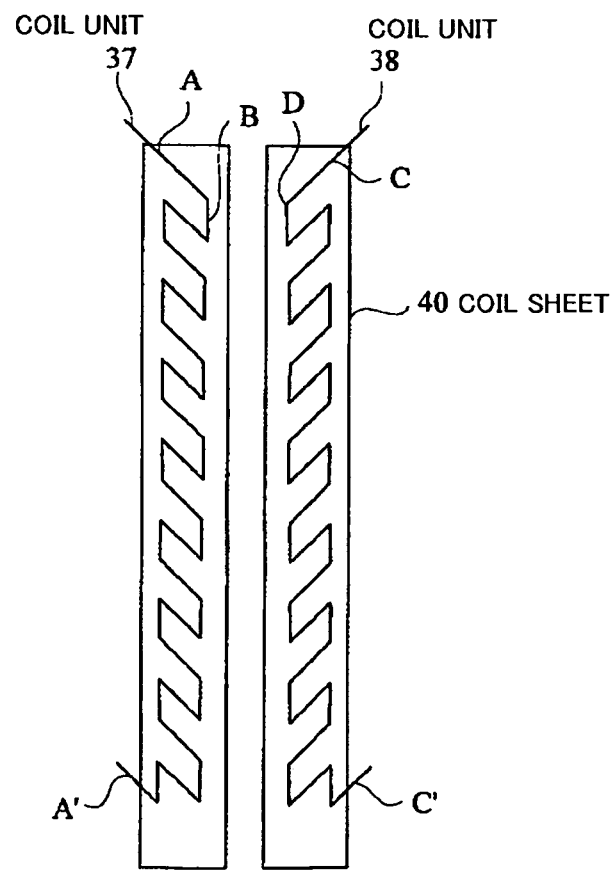
FIG. 23 is a development diagram of a coil unit used in a torque sensor in an eighth preferred embodiment of the invention.

FIG. 23 is a diagram showing an example of the construction of the torque sensor in the eighth preferred embodiment of the invention. The construction of the torque sensor shown in FIG. 23 is the same as that of the torque sensor shown in FIGS. 5A to 5C, except that coil units 37, 38 are used instead of the first and second coil units 3, 4. The form of the coils shown in FIG. 23 is such that, as viewed from the top, unlike the coil in a closed form, only parallel wiring parts of ±45 degrees and wiring which unidirectionally connects adjacent parallel wiring parts in an alternate manner only in a coil extended direction are provided. Even in the case of the construction shown in FIG. 23, magnetostrictive properties which undergo a change depending upon the torque are detected by the wiring parts of ±45 degrees. Therefore, the torque sensor in this embodiment can function in the same manner as the torque sensors in the above embodiments.

In the above embodiments of the invention, the method for winding the coil has been explained by taking a method, in which winding is carried out only once, as an example. Alternatively, a method may also be adopted in which a wavy form may be constructed while conducting winding a plurality of times on the same place. Further, a method may also be adopted in which wavy winding may be superimposed a plurality of times. Furthermore, in a part of the above embodiments, the coil is basically in the form of a substantially parallelogram. Alternatively, a form obtained by deforming the parallelogram may also be adopted so far as magnetostrictive properties in ±45-degree direction on an identical plane to the rotating shaft can be obtained.

Likewise, in the case where a groove is provided in the ring, the form of the coil is not limited to a parallelogram. The torque sensor which does not require working of the rotating shaft has mainly been explained. However, the sensitivity can be further improved, for example, by subjecting the rotating shaft to working to provide a 45-degree groove or the like and combining methods for enhancing the sensitivity on the rotating shaft side. Therefore, the invention can be effectively applied to a torque sensor provided with a worked rotating shaft. These embodiments also fall within the scope of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A torque sensor for detecting a torque of a rotating shaft having magnetostrictive properties, comprising:
    coil units which each comprise a plurality of coils and are disposed along a virtual concentric circle drawn on said rotating shaft, said coil units including lines extended in a direction which crosses a direction substantially parallel to the direction of rotation of said rotating shaft, said coil units constituting a folded structure comprising first wiring comprising a line, which constitutes a snaking first path and is extended in a direction which crosses a direction substantially parallel to the direction of rotation of the rotating shaft, and second wiring which constitutes a snaking second path, insulation being made at crossed parts where the first wiring crosses the second wiring, a closed coil is formed in a region surrounded by the first wiring and the second wiring; and
    a detection section to detect a change in properties of the coil units.

2. A torque sensor for detecting a torque of a rotating shaft having magnetostrictive properties, comprising:
    first and second coil units which each comprise a plurality of coils and are disposed along a virtual concentric circle drawn on said rotating shaft, said first and second coil units including lines extended in a direction which crosses a direction substantially parallel to the direction of rotation of said rotating shaft, said coil units constituting a folded structure comprising first wiring constituting a snaking first path and second wiring constituting a snaking second path, insulation being made at crossed parts where the first wiring crosses the second wiring, a closed coil is formed in a region surrounded by the first wiring and the second wiring; and
    a detection section to detect a change in properties of the coil units.

3. The torque sensor according to claim 2, wherein, in said coil units, adjacent lines extended in said crossing direction are disposed so as to be substantially superimposed on top of each other to form a continuous closed coil chain.

4. The torque sensor according to claim 2, wherein an insulating sheet is provided between said first coil unit and said second coil unit for insulating said first and second coil units from each other.

5. The torque sensor according to claim 2, wherein said first and second coil units are arranged so that a direction of magnetostrictive properties of the rotating shaft detected by said first coil unit is different from a direction of magnetostrictive properties of the rotating shaft detected by said second coil unit.

6. The torque sensor according to claim 2, wherein said first and second coil units are arranged so that a normal direction of each coil face formed by said first and second coils is substantially parallel to the radial direction of the rotating shaft.

7. The torque sensor according to claim 6, wherein said coil faces are disposed in a radially superimposed state.

8. The torque sensor according to claim 2, wherein said first wiring and said second wiring each are formed by only lines which are extended in a direction which crosses a direction substantially parallel to the direction of rotation of said rotating shaft.

9. The torque sensor according to claim 2, wherein said first wiring and said second wiring each are formed by a first line extended in a direction substantially parallel to the direction of rotation of said rotating shaft, and a second line extended in a direction which crosses a perpendicular line to said first line, and said first line in the first coil unit and the first line in the second coil unit are arranged so that, at substantially the same position, a direction of flow of current, which flows in the first line in the first coil unit, is opposite to a direction of flow of current which flows in the first line in the second coil unit.

10. The torque sensor according to claim 2, wherein said first coil unit is formed of a coil having two sides in which projection on a rotation center axis line of said rotating shaft makes an angle of about +α degrees with said rotation center axis line, and said second coil unit is formed of a coil having two sides in which projection on the rotation center axis line of said rotating shaft makes an angle of about −α degrees with said rotation center axis line.

11. The torque sensor according to claim 2, wherein said first and second coil units are supported respectively on first and second coil sheets formed of a nonmagnetic maternal, respectively.

12. The torque sensor according to claim 2, wherein the number of coils included in the first and second coil units are respectively 2n and 2m where n and m are an integer of 2 or more and the coils are disposed in a belt form on an entire circumference of the rotating shaft.

13. The torque sensor according to claim 2, wherein a form of the coils constituting the first coil unit and the second coil unit is substantially parallelogramatical.

14. The torque sensor according to claim 13, wherein a narrow apex angle of said parallelogram is not less than 30 degrees and not more than 60 degrees.

15. The torque sensor according to claim 13, wherein the coils constituting the first coil unit and the coils constituting the second coil unit satisfy a requirement represented by the following equation:

$$W \approx k(\pi D/2N) \cdot \tan \theta$$

wherein
W represents a width of the coil constituting the first and second coil units in a direction in which a rotation center axis of said rotating shaft is extended;
k is an integer;
θ represents an angle of an apex constituting a narrow apex angle;
D represents a diameter of the rotating shaft;
N represents the number of coils contained in the first and second coil units; and
π represents a circular constant.

16. The torque sensor according to claim 2, wherein the line constituting the first coil unit and a line constituting the second coil unit are arranged so as to be orthogonal to each other over substantially the whole area around said rotating shaft.

17. The torque sensor according to claim 2, wherein the coil units are each wound alternately in a clockwise direction and a counterclockwise direction.

18. A torque sensor for detecting a torque of a rotating shaft having magnetostrictive properties, comprising:
a magnetic ring disposed on an outer circumference of said rotating shaft;
first and second coil units which each comprise a plurality of coils and are disposed along a virtual concentric circle drawn on said rotating shaft, said first and second coil units including lines extended in a direction which crosses a direction substantially parallel to the direction of rotation of said rotating shaft, said coil units constituting a folded structure comprising first wiring constituting a snaking first path and second wiring constituting a snaking second path, insulation being made at crossed parts where the first wiring crosses the second wiring, a closed coil is formed in a region surrounded by the first wiring and the second wiring; and
a detection section to detect a change in properties of the coil units.

19. The torque sensor according to claim 18, wherein a groove for receiving at least one of said first and second coil units is provided on an inner face of the magnetic ring.

20. The torque sensor according to claim 19, wherein a sectional form of a magnetic path constituted by said groove has at least a part which is in an isosceles triangle form.

21. A torque sensor for detecting a torque of a rotating shaft having magnetostrictive properties, comprising:
first and second coil units that are disposed to surround an outer circumference of said rotating shaft,
wherein said first and second coil units each are in a concentric relationship with said rotating shaft, and are provided with first wiring constituting a current path for allowing current to flow snake-wise in one direction of directions of rotation of said rotating shaft and second wiring constituting a current path, folded from said first wiring, for allowing current to flow snake-wise in the other direction of the directions of rotation of said rotating shaft,
wherein said first wiring and said second wiring in said first coil unit include a plurality of current paths that are extended substantially parallel to a direction of action of one of two forces acting on said rotating shaft, are close to each other, and allow current to flow therethrough in an identical direction, and
wherein said first wiring and said second wiring in said second coil unit include a plurality of current paths that are extended substantially parallel to the direction of action of the other force of two forces acting on said rotating shaft and allow current to flow therethrough in an identical direction.

22. The torque sensor according to claim 21, wherein in said first and second coil units, the directions of current which flows through said plurality of current paths are alternately varied relative to the direction of rotation of said rotating shaft.

23. The torque sensor according to claim 21, wherein said first and second coil units produce magnetic properties which are orthogonal to a direction in which said plurality of current paths are extended.

24. The torque sensor according to claim 21, wherein said first and second coil units are juxtaposed on said rotating shaft.

25. The torque sensor according to claim 21, wherein said first and second coil units are arranged in a superimposed state on said rotating shaft.

26. The torque sensor according to claim 21, wherein the first and second coil units are each wound alternately in a clockwise direction and a counterclockwise direction.

* * * * *